United States Patent
Lee et al.

(10) Patent No.: US 11,503,640 B2
(45) Date of Patent: Nov. 15, 2022

(54) METHOD FOR TRANSMITTING AND RECEIVING FEEDBACK INFORMATION, AND TERMINAL THEREFOR

(71) Applicant: LG ELECTRONICS INC., Seoul (KR)

(72) Inventors: Hojae Lee, Seoul (KR); Gwanmo Ku, Seoul (KR); Haewook Park, Seoul (KR); Kilbom Lee, Seoul (KR); Sangrim Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 240 days.

(21) Appl. No.: 16/761,486

(22) PCT Filed: Nov. 8, 2018

(86) PCT No.: PCT/KR2018/013545
§ 371 (c)(1),
(2) Date: May 4, 2020

(87) PCT Pub. No.: WO2019/093788
PCT Pub. Date: May 16, 2019

(65) Prior Publication Data
US 2020/0267767 A1    Aug. 20, 2020

Related U.S. Application Data

(60) Provisional application No. 62/584,114, filed on Nov. 10, 2017.

(51) Int. Cl.
*H04W 74/08* (2009.01)
*H04W 4/44* (2018.01)
(Continued)

(52) U.S. Cl.
CPC ....... *H04W 74/0825* (2013.01); *H04L 1/1861* (2013.01); *H04L 5/0053* (2013.01);
(Continued)

(58) Field of Classification Search
None
See application file for complete search history.

(56) References Cited

U.S. PATENT DOCUMENTS

2007/0211751 A1 * 9/2007 Yoshikawa ........... H04L 12/413
370/442
2013/0010767 A1    1/2013 Wang et al.
(Continued)

FOREIGN PATENT DOCUMENTS

WO    2015/088276 A1    6/2015
WO    WO-2016167606 A1 * 10/2016 ........... H04L 1/0026

*Primary Examiner* — Saumit Shah
(74) *Attorney, Agent, or Firm* — Dentons US LLP

(57) ABSTRACT

A method by which a terminal transmits feedback information comprises the steps of: determining, in predetermined resource units for receiving the broadcast information in a broadcast resource region, whether broadcast information collides; selecting a first shared resource in a shared resource region corresponding to a first broadcast resource in which the conflict occurs in the broadcast resource region, on the basis of a pre-defined mapping rule of the broadcast resource region and the shared resource region; and transmitting, in the selected first shared resource, feedback information including information on the occurrence of the collision, wherein the broadcast resource region is a resource region, which is defined so as to transmit or receive the broadcast information, and the shared resource region can be determined as a resource region shared between a plurality of terminals. The UE is capable of communicating with at least one of another UE, a UE related to an autonomous driving vehicle, a base station or a network.

11 Claims, 19 Drawing Sheets

(51) Int. Cl.
*H04L 1/18* (2006.01)
*H04L 5/00* (2006.01)
*H04W 72/02* (2009.01)
*H04W 72/04* (2009.01)
*H04W 72/12* (2009.01)

(52) U.S. Cl.
CPC ............. *H04L 5/0094* (2013.01); *H04W 4/44* (2018.02); *H04W 72/02* (2013.01); *H04W 72/042* (2013.01); *H04W 72/121* (2013.01)

(56) References Cited

U.S. PATENT DOCUMENTS

| | | |
|---|---|---|
| 2016/0261389 A1 | 9/2016 | Bontu et al. |
| 2017/0141861 A1* | 5/2017 | Zhang ..................... H04L 67/12 |
| 2017/0188391 A1 | 6/2017 | Rajagopal et al. |
| 2017/0280469 A1 | 9/2017 | Park et al. |
| 2018/0103456 A1* | 4/2018 | Zhao ..................... H04W 48/04 |
| 2018/0115430 A1* | 4/2018 | Seo ........................... H04L 1/12 |
| 2018/0324676 A1* | 11/2018 | Huang ................ H04W 72/042 |
| 2020/0068609 A1* | 2/2020 | Wang ................... H04W 72/02 |

* cited by examiner

METHOD FOR TRANSMITTING AND RECEIVING FEEDBACK INFORMATION, AND TERMINAL THEREFOR

This application is a National Stage Application of International Application No. PCT/KR2018/013545, filed on Nov. 8, 2018, which claims the benefit of U.S. Provisional Application No. 62/584,114, filed on Nov. 10, 2017, all of which are hereby incorporated by reference in their entirety for all purposes as if fully set forth herein.

TECHNICAL FIELD

The present disclosure relates to wireless communication, and more particularly, to a method for transmitting and receiving feedback information and a user equipment (UE) therefor.

BACKGROUND ART

With the introduction of a new radio access technology (RAT) system, as more and more communication devices require greater communication capacity, there is a need for mobile broadband communication more enhanced than the conventional Radio Access Technology (RAT).

In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

DISCLOSURE

Technical Problem

An object of the present disclosure is to provide a method for transmitting feedback information by a UE.

Another object of the present disclosure is to provide a method for receiving feedback information by a UE.

Still another object of the present disclosure is to provide a UE for transmitting feedback information.

Further still another object of the present disclosure is to provide a UE for receiving feedback information.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve the object of the present disclosure, a method for transmitting feedback information by a UE comprises determining whether collision of broadcast information has occurred in a predetermined resource unit for receiving broadcast information in a broadcast resource region; selecting a first shared resource in a shared resource region corresponding to a first broadcast resource where the collision has occurred, from the broadcast resource region based on a predefined mapping rule of the broadcast resource region and the shared resource region; and transmitting feedback information that includes information on occurrence of the collision in the selected first shared resource, wherein the broadcast resource region is a resource region defined to transmit or receive the broadcast information, and the shared resource region may be defined as a resource region shared among multiple UEs.

The determining step may include determining that the collision has occurred when energy detected in the predetermined resource unit exceeds a predefined threshold value but decoding of the broadcast information is failed in the predetermined resource unit.

The method may further comprise selecting a second shared resource in a shared resource region corresponding to a second broadcast resource where the collision has occurred, from the broadcast resource region based on the predefined mapping rule of the broadcast resource region and the shared resource region, and transmitting feedback information that includes information on occurrence of the collision in the selected second shared resource.

The predetermined resource unit may correspond to one time slot. The broadcast resource region and the shared resource region may be configured in time and frequency domains in accordance with a frequency division multiplexing manner or time division multiplexing manner.

The method may further comprise receiving information on the predefined mapping rule of the broadcast resource region and the shared resource region from a BS.

To achieve another object of the present disclosure, a method for receiving feedback information by a UE comprises transmitting broadcast information in a first broadcast region of a broadcast resource region; determining whether energy of a predetermined threshold value or more is detected from a first shared resource in a shared resource region corresponding to the first broadcast resource region; and if energy of a predetermined threshold value or more is detected, selecting a second broadcast resource as a broadcast resource for transmitting the broadcast information, wherein the broadcast resource region is a resource region defined to transmit or receive the broadcast information, and the shared resource region may be defined as a resource region shared among multiple UEs.

The method may further comprise transmitting the broadcast information in the second broadcast resource. The determining step may include recognizing that collision has occurred, if energy of a predetermined threshold value or more is detected from the first broadcast resource.

To achieve still another object of the present disclosure, a UE for transmitting feedback information comprises a processor determining whether collision of broadcast information has occurred in a predetermined resource unit for receiving broadcast information in a broadcast resource region, and selecting a first shared resource in a shared resource region corresponding to a first broadcast resource where the collision has occurred, from the broadcast resource region based on a predefined mapping rule of the broadcast resource region and the shared resource region; and a transmitter transmitting feedback information that includes information on occurrence of the collision in the selected first shared resource, wherein the broadcast resource region is a resource region defined to transmit or receive the broadcast information, and the shared resource region may be defined as a resource region shared among multiple UEs.

The processor may determine that the collision has occurred when energy detected in the predetermined resource unit exceeds a predefined threshold value but decoding of the broadcast information is failed in the predetermined resource unit.

The processor may select a second shared resource in a shared resource region corresponding to a second broadcast resource where the collision has occurred, from the broadcast resource region based on the predefined mapping rule of the broadcast resource region and the shared resource region, and the transmitter may transmit feedback information that includes information on occurrence of the collision in the selected second shared resource. The UE may further comprise a receiver receiving information on the predefined mapping rule of the broadcast resource region and the shared resource region from a BS.

To achieve further still another object of the present disclosure, a UE for receiving feedback information comprises a transmitter transmitting broadcast information in a first broadcast region of a broadcast resource region; and a processor determining whether energy of a predetermined threshold value or more is detected from a first shared resource in a shared resource region corresponding to the first broadcast resource region, and if energy of a predetermined threshold value or more is detected, selecting a second broadcast resource as a broadcast resource for transmitting the broadcast information, wherein the broadcast resource region is a resource region defined to transmit or receive the broadcast information, and the shared resource region may be defined as a resource region shared among multiple UEs. The processor may recognize that collision has occurred, if energy of a predetermined threshold value or more is detected from the first broadcast resource.

Advantageous Effects

In a broadcast based control information and data transmission environment, UEs may perform feedback in accordance with one embodiment of the present disclosure even in the case that there is no little assistance of a central coordinator.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention.

BEST MODE FOR CARRYING OUT THE INVENTION

Figure 1:
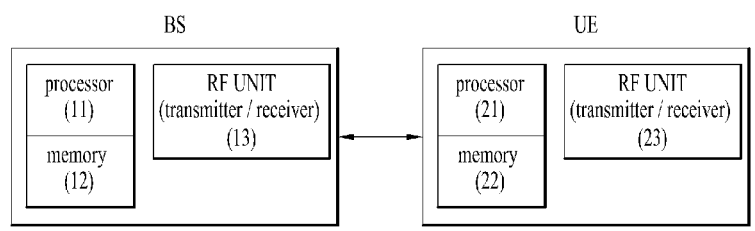
FIG. 1 is a diagram illustrating a wireless communication system for implementing the present disclosure.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Moreover, in the following description, it is assumed that a user equipment (UE) refers to a mobile or fixed type user equipment such as a mobile station (MS) and an advanced mobile station (AMS). Also, it is assumed that a base station refers to a random node of a network terminal, such as Node B, eNode B, access point (AP), gNode B (gNB), which performs communication with the user equipment.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following technology may be used for various wireless access systems such as CDMA (code division multiple access), FDMA (frequency division multiple access), TDMA (time division multiple access), OFDMA (orthogonal frequency division multiple access), SC-FDMA (single carrier frequency division multiple access), and 5G communication system. The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system.

Moreover, in the following description, specific terminologies are provided to help the understanding of the present invention. And, the use of the specific terminology can be modified into another form within the scope of the technical idea of the present invention.

FIG. 1 is a diagram illustrating a wireless communication system for implementing the present disclosure.

Referring to FIG. 1, the wireless communication system includes a base station (BS) 10 and one or more user equipments (UEs) 20. In a downlink, a transmitter may be a part of the BS 10, and a receiver may be a part of the UE 20. In an uplink, the BS 10 may include a processor 11, a memory 12, and a radio frequency (RF) unit 13 (transmitter and receiver). The processor 11 may be configured to implement suggested procedures and/or methods disclosed in this application. The memory 12 is combined with the processor 11 and stores various kinds of information for operating the processor 11. The RF unit 13 is combined with the processor 11 and transmits and/or receives a radio signal. The UE 20 may include a processor 21, a memory 22, and an RF unit 23 (transmitter and receiver). The processor 21 may be configured to implement suggested procedures and/or methods disclosed in this application. The memory 22 is combined with the processor 21 and stores various kinds of information for operating the processor 21. The RF unit 23 is combined with the processor 21 and transmits and/or receives a radio signal. The BS 10 and/or the UE 20 may have a single antenna and multiple antennas. If at least one of the BS 10 and the UE 20 has multiple antennas, the wireless communication system may be referred to as a MIMO (multiple input multiple output) system.

In this specification, the processor 21 of the UE and the processor 11 of the BS perform an operation for processing signal and data except a function of receiving or transmitting a signal by the UE 20 and the BS 10 and a storage function. However, for convenience of description, the processors 11 and 21 will not be mentioned especially. Unless the processors 11 and 21 are mentioned especially, a series of operations such as data processing not a function of receiving or transmitting a signal may be performed.

Layers of a radio interface protocol among between the UE 20 and the BS 10 or a wireless communication system (network) may be classified into a first layer L1, a second layer L2 and a third layer L3 on the basis of three lower layers of OSI (open system interconnection) model widely known in communication systems. A physical layer belongs to the first layer L1 and provides an information transfer service using a physical channel. A radio resource control (RRC) layer belongs to the third layer and provides control radio resources between the mobile station and the network. The UE 10 and the BS 20 may exchange RRC messages with the wireless communication network through the RRC layer.

In the Legacy LTE and 5G NR system, an environment where broadcast based control information and data are transmitted is considered (e.g., V2X, V2V, D2D, . . . ), and a feedback channel between UEs may be required. In this case, a variety of the feedback information such as collision information indicating a channel or link status, channel quality information, etc. may be required. In the present disclosure, a method for broadcasting feedback of collision information will be described but another information may be applied in the same manner.

Figure 2:
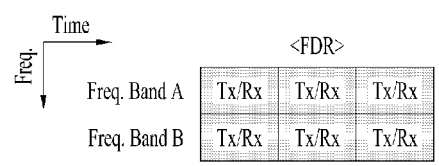
FIG. 2 is an exemplary diagram illustrating transmission based on a duplex mode.
Figure 2:
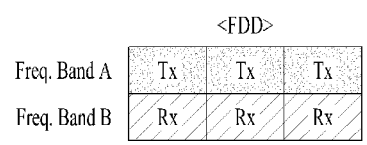
Figure 2:
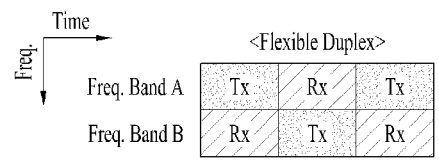
Figure 2:
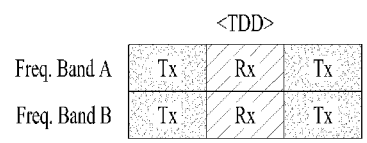

FIG. 2 is an exemplary diagram illustrating transmission based on a duplex mode.

For description of the present disclosure, a device (which may be a UE or BS) is categorized by the following definition.

Full Duplex Radio (FDR) (or Inband Full Duplex) device may perform transmission (Tx) and reception (Rx) operation at Inband (one frequency band) at the same time.

Flexible Duplex device may perform Tx at one band A of duplicated bands (two frequency bands) and Rx at the other one band B at the same time. However, the flexible duplex device may perform Rx at one band A and Tx at the other band B at different times. In this case, for operation for each band, Tx/Rx chain may exist (if Tx/Rx chain is configured for operation per band, or if Tx/Rx chain enables band switching), Half Duplex TDD operation at each band may be performed.

(Full Duplex) FDD device may perform Tx at one band of duplicated bands (or paired spectrum, two frequency bands) and Rx at the other one band at the same time. (Half Duplex) TDD device may perform only Tx or Rx at a single timing point.

Suggestion 1: Broadcast Feedback Mechanism Based on Shared Resource from Frequency Division Manner FIG. 3 is a diagram illustrating allocation of a broadcast resource (or broadcasting resource) and a shared resource in a time-frequency domain.

Figure 3:
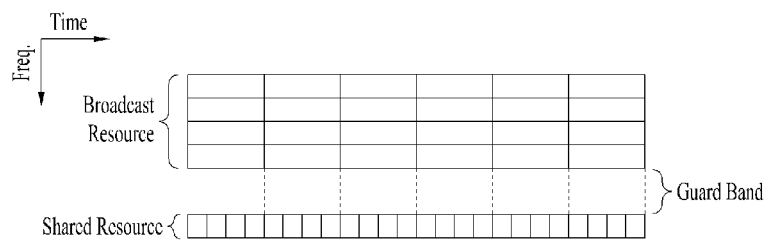
FIG. 3 is a diagram illustrating allocation of a broadcast resource (or broadcasting resource) and a shared resource in a time-frequency domain.

As shown in FIG. 3, the present disclosure suggests a method for performing a broadcast feedback in an environment where a broadcast resource and a shared resource are classified on a frequency domain. That is, a broadcast resource to which control information/data are transmitted and a shared resource region to which information on collision, decoding failure, etc. of control information/data is fed back are classified in a frequency domain. That is, a specific bandwidth may be used as an independent channel for feedback, and may always be used as a shared resource. The broadcast resource is a region for transmitting control information/data in accordance with a support method in a broadcasting system. For example, in V2V/V2X of the LTE system, the UE may broadcast its control information/data to an empty resource by sensing transmission information of other UEs. The shared resource is a resource shared by all devices (or UE/BS), and is an area for transmitting information regardless of transmission of another device (or UE/BS).

Since UEs should exchange information through transmission and reception in the broadcast resource and the shared resource, the UEs may be any one of UEs which are supported by FDR, Flexible Duplex, and TDD. For example, in case of FDR UE, since reception/transmission may be performed in all physical resources, the FDR UE may be applied regardless of configuration of the broadcast resource and the shared resource.

Broadcasting resource—Tx/Rx, shared resource? Tx/Rx

For example, in case of flexible duplex UE, the frequency band A of FIG. 2 may be configured as the broadcast resource and the frequency band B may be configured as the shared resource. In this case, Tx/Rx procedure of the shared resource may be performed regardless of Tx/Rx procedure of the broadcast resource.

Broadcasting resource—Tx, shared resource—Rx
Broadcasting resource—Rx, shared resource—Rx
Broadcasting resource—Tx, shared resource—Tx
Broadcasting resource—Rx, shared resource—Tx For example, in case of TDD UE, the frequency band A of FIG. 2 may be configured as the broadcast resource and the frequency band B may be configured as the shared resource. In this case, Tx/Rx procedure of the shared resource should be performed in the same manner as Tx/Rx procedure of the broadcast resource. In this case, a guard band may not be required. That is, the shared resource and the broadcast resource may be configured by frequency-division multiplexing (FDM) scheme in the time-frequency domain.

Broadcasting resource—Rx, shared resource—Rx
Broadcasting resource—Tx, shared resource—Tx An operation for emptying the resources without performing Tx or Rx in the broadcast resource or the shared resource may be included in the whole operation. This may be required for energy efficiency or information exchange traffic control, and a control condition is described in the detailed description of the present disclosure. It is assumed that the shared resource may always be identified from a bandwidth through which data and control information are broadcasted, and the UE may perform TDD operation in each of a data broadcasting area and a shared resource region. In the above operation, in order to solve an interference problem between the broadcast resource and the shared resource, a guard band may be considered and may be predefined in accordance with a system environment.

Broadcast Feedback in Shared Resource

Figure 4:
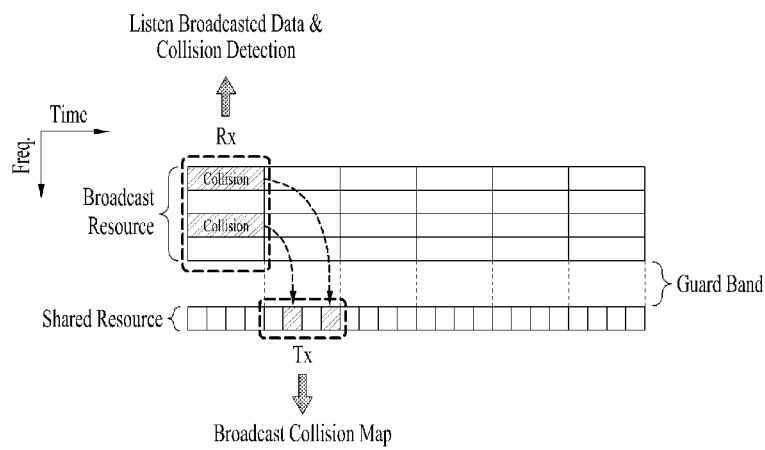
FIG. 4 is a diagram illustrating that broadcast feedback is performed in a shared resource.

FIG. 4 is a diagram illustrating that broadcast feedback is performed in a shared resource.

The UE may detect collision of a broadcast resource. For example, if energy beyond a specific threshold is detected from the broadcast resource but decoding of data/control information is not performed successfully, it may be determined as collision. This may be performed in both a region to which control information is transmitted and a region to which data are transmitted. Collision information (or NACK information) of the broadcast resource and the shared resource may be tied at 1:1, N:1 and 1:M. A mapping relation of the broadcast resource and the shared resource will be described based on the number of predefined resources within a given unit.

For example, n number of broadcast resources may exist in a given unit (for example, 1 ms Time Slot w/5 MHz). In this case, the n number of resources may be multiplexed by various methods such as FDM/TDM/CDM, and may be multiplexed by combination of two or more methods. In the above case, a spatial domain and a power domain may be included in a unit for identifying resources by a prescheduled method. The given unit is information commonly known by all UEs, and may be prescheduled by a system. In case of a broadcasting system supported by a network, the given unit may previously be known by Common Control Signaling (e.g., higher layer information such as RRC Signaling or Physical Layer information such as DCI) of the Network (or gNB), and may be reallocated adaptively in accordance with a change of a system environment.

Also, m number of shared resources of a given unit may exist in a region identified from frequency where the broadcast resource exists. In this case, the m number of resources may be multiplexed by various methods such as FDM/TDM/CDM, and may be multiplexed by combination of two or more methods. A spatial domain and a power domain may be included in a unit for identifying resources by a prescheduled method. The given unit is information commonly known by all UEs, and may be prescheduled by a system. In case of a broadcasting system supported by a network, the given unit may previously be known by Common Control Signaling (e.g., higher layer information such as RRC Signaling or Physical Layer information such as DCI) of the Network (or gNB), and may be reallocated adaptively in accordance with a change of a system environment.

In the above description, a display of collision of the n number broadcast resources based on the m number of shared resources of a given unit is defined as a transfer of a collision map. The unit constituting each of the shared resources may be different from the unit constituting each of the broadcast resources.

In the following description, when the n number of broadcast resources and the m number of shared resources are identified from each other, it is assumed that each resource is indexed within each resource pool.

Case 1: Maximum Index of Broadcast Resources (n)=Maximum Index of Shared Resources (m)

Figure 5:
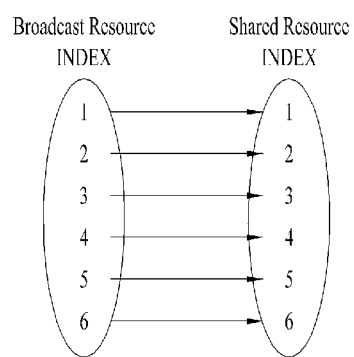
FIG. 5 is a diagram illustrating a mapping relation between a broadcast resource index and a shared resource index according to Case 1.

FIG. 5 is a diagram illustrating a mapping relation between a broadcast resource index and a shared resource index according to Case 1.

Case 1 is a case that the number of broadcast resources in a given unit is the same as the number of shared resources in a given unit. In this case, the broadcast resources and the shared resources may be subjected to 1:1 mapping. For example, broadcast resource index=shared resource index. For example, if the number of maximum broadcast resources is 6 and the number of maximum shared resources is 6, when collision is detected from a region corresponding to broadcast resource 1, collision is displayed in a region corresponding to shared resource 1 (in this case, display of collision means transmission of random information such that a receiver may detect the random information in accordance with a predefined method. The random information means all manners that may be detected by the receiver. A behavior for transmitting a power to detect energy means a behavior for transferring information such as specific symbol/sequence). For example, this case is as shown in FIG. 5. The receiver may recognize that collision of broadcast information has occurred in a position mapped with a region where energy beyond a specific threshold is detected from the m number of resources in the shared resource region. In this case, the shared resources may be multiplexed by various methods such as FDM/TDM/CDM, and may be multiplexed by combination of two or more methods. In the above description, the spatial domain and the power domain may be included in a unit for identifying resources by a prescheduled method.

Case 2: Maximum Index of Broadcast Resource(n)> Maximum Index of Shared Resource(m)

Figure 6:
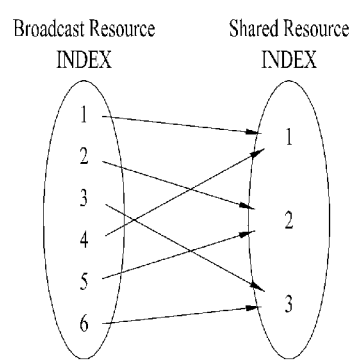
FIG. 6 is a diagram illustrating a mapping relation between a broadcast resource index and a shared resource index according to Case 2.

FIG. 6 is a diagram illustrating a mapping relation between a broadcast resource index and a shared resource index according to Case 2.

Case 2 is a case that the number of broadcast resources in a given unit is greater than the number of shared resources in a given unit. In this case, the broadcast resources and the shared resources may be subjected to N:1 mapping. For example, broadcast resource index>shared resource index. For example, if the number of maximum broadcast resources is 6 and the number of maximum shared resources is 3, when collision is detected from a region corresponding to broadcast resources 1 and 4, collision is displayed in a region corresponding to shared resource 1 (in this case, display of collision means transmission of random information such that a receiver may detect the random information in accordance with a predefined method. The random information means all manners that may be detected by the receiver. A behavior for transmitting a power to detect energy means a behavior for transferring information such as specific symbol/sequence). For example, in case of N:1 mapping, for N:1 mapping of broadcast resources and shared resources, N number of broadcast resources are mapped into one shared resource. Then, selection of the shared resource may be defined as shared resource index=mod(broadcast resource, Maximum shared resource index). For example, if the number of maximum shared resources is 3 and the number of maximum broadcast resources is 6, when the broadcast resource index is 1 or 4, the shared resource index is 1, and when the broadcast resource index is 2 or 5, the shared resource index is 2. For example, this is as shown in FIG. 6.

The receiver recognizes that collision of broadcast information has occurred in a position mapped with a region where energy beyond a specific threshold is detected from the m number of resources in the shared resource region. That is, the receiver recognizes that N number of broadcasts are all collision through one detection. In this case, the shared resources may be multiplexed by various methods such as FDM/TDM/CDM, and may be multiplexed by combination of two or more methods. In the above description, the spatial domain and the power domain may be included in a unit for identifying resources by a prescheduled method. In the above operation, an entity for transmitting the shared resource transmits information to shared resource 1 when collision occurs in the broadcast resource 1, collision occurs in the broadcast resource 4, or collision occurs in both the broadcast resources 1 and 4. Then, an entity for receiving the shared resource recognizes that collision has occurred in both the broadcast resources 1 and 4. This process may be required in an environment that the shared resources are not obtained sufficiently. Afterwards, ambiguity for collision resources may be solved by an operation (for example, Resource Hopping/Resource Reselection) for controlling collision.

Case 3: Maximum Index of Broadcast Resources(n) <Maximum Index of Shared Resources(m)

Figure 7:
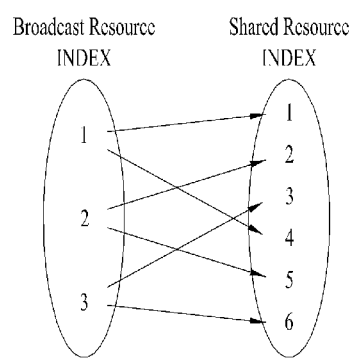
FIG. 7 is a diagram illustrating a mapping relation between a broadcast resource index and a shared resource index according to Case 3.

FIG. 7 is a diagram illustrating a mapping relation between a broadcast resource index and a shared resource index according to Case 3.

Case 3 is a case that the number of broadcast resources in a given unit is smaller than the number of shared resources in a given unit. In this case, the broadcast resources and the shared resources may be subjected to 1:M mapping. For example, broadcast resource index<shared resource index. For example, if the number of maximum broadcast resources is 3 and the number of maximum shared resources is 6, when collision is detected from a region corresponding to broadcast resource 1, collision is displayed in a region corresponding to shared resource 1 or 4 (in this case, display of collision means transmission of random information such that a receiver may detect the random information in accordance with a predefined method. The random information means all manners that may be detected by the receiver. A behavior for transmitting a power to detect energy means a behavior for transferring information such as specific symbol/sequence). For example, in case of 1:M mapping, for 1:M mapping of broadcast resources and shared resources, one broadcast resource is mapped into M shared resources. Then, selection of the shared resource may be defined as broadcast resource index=$^{[Shared\ Resource\ INDEX/M]}$ (=ceil (shared resource index/M)). For example, if the number of maximum shared resources is 3 and the number of maximum broadcast resources is 6, when the broadcast resource index is 1, the shared resource index is 1 or 4, and when the broadcast resource index is 2, the shared resource index is 2 or 5. For example, this is as shown in FIG. 7.

The receiver recognizes that collision of broadcast information has occurred in a position mapped with a region where energy beyond a specific threshold is detected from the m number of resources in the shared resource region. That is, the receiver recognizes that 1 broadcast is collision through one or multiple detections (e.g., maximum M). That is, an entity for transmitting collision information through the shared resource selects one of the shared resources mapped into the broadcast resources and transmits information to the selected resource. A method for selecting one of multiple shared resources is as follows.

Random Selection: resource index may randomly be selected within a shared resource pool that may be selected.

Modulo computation based Selection: Resource index matched with a modulo computation value is selected within a shared resource pool that may be selected based on UE ID (in this case, ID may be Physical ID or higher Layer ID, e.g., C-RNTI) in the same manner as computation of mod(UE ID, M). For example, in the above example, if UE ID is an odd number, when the broadcast resource index is 1, the shared resource index may be 1, and when the broadcast resource index is 1, the shared resource index may be 4.

Otherwise, an entity that intends to transmit collision information to the shared resource selects all shared resources (all of M) mapped into the broadcast resource and transmits information to the shared resources. In this operation, if the shared resources are subjected to FDM/CDM, a power carried in each shared resource may be reduced but the probability that destructive interference may occur in all (M) shared resources may be reduced, whereby the operation has trade-off (M). If the shared resources are subjected to TDM, destructive interference may be avoided without energy loss.

Otherwise, an entity that intends to transmit collision information to the shared resource selects L number of shared resources (1<L<M) mapped into the broadcast resource and transmits information to the shared resources. In this operation, randomness may be generated in destructive interference in accordance with selection of the shared resources, whereby this operation may be effective in accordance with a system environment and status. A value of L is information which is commonly known by all UEs or may be selected UE-specifically, and may be prescheduled by a system. In case of a broadcasting system supported by a network, the value may previously be known by Common Control Signaling (e.g., higher layer information such as RRC Signaling or Physical Layer information such as DCI) of the Network (or gNB), and may be reallocated adaptively in accordance with a change of a system environment. In this case, the shared resources may be multiplexed by various methods such as FDM/TDM/CDM, and may be multiplexed by combination of two or more methods. In the above description, the spatial domain and the power domain may be included in a unit for identifying resources by a pre-scheduled method.

In the above operation, an entity for transmitting the shared resource transmits information to shared resource 1 or 4 when collision occurs in the broadcast resource 1. Then, an entity for receiving the shared resource recognizes that collision has occurred in the broadcast resource 1 if energy is detected from the shared resource 1, energy is detected from the shared resource 4, or energy is detected from both the shared resources 1 and 4. This process may be required for exact detection of the shared resources in an environment that the shared resources are obtained sufficiently. Since the shared resource is a region to which multiple users transmit information in common, destructive interference (e.g., if two signals are states of phase inversion, two signals are added by the receiver and reach a size of 0) may occur by channels of multiple users, whereby energy beyond threshold cannot be detected in spite of information transmission. To this end, if there are multiple shared resources connected to one collision, the destructive interference may be solved.

Time Offset of Shared Resource

Figure 8:
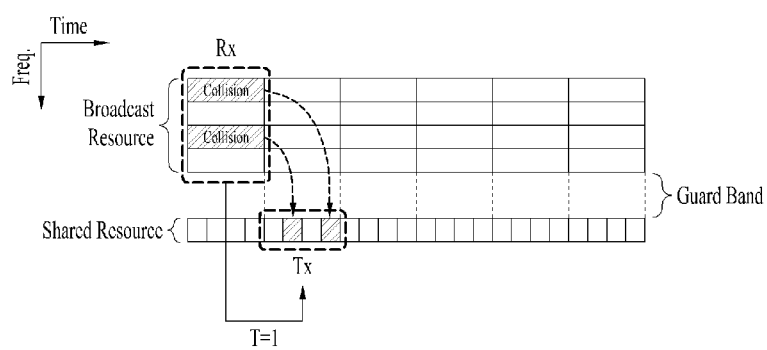
FIG. 8 is a diagram illustrating time offset of a shared resource.
Figure 8:
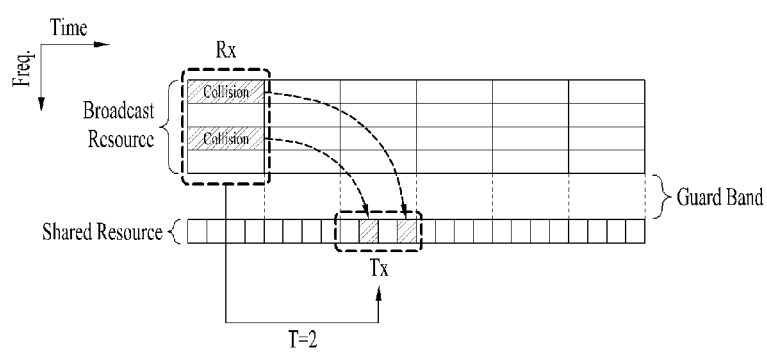

FIG. 8 is a diagram illustrating time offset of a shared resource.

In a tied relation of collision information (or NACK information) of broadcast resources of a given unit and shared resources of a given unit, time offset may be predefined. When time offset is T, if T=1, the UE may transmit collision map information in accordance with a tie rule determined in the shared resource after one slot based on a time slot at which collision is detected. For example, the tie relation of the shared resource of the given unit and collision information (or NACK information) of the broadcast resource of the given unit may be expressed as follows in accordance with T.

Time offset T is information which is commonly known by all UEs or may be prescheduled by a system. In case of a broadcasting system supported by a network, the time offset T may previously be known by Common Control Signaling (e.g., higher layer information such as RRC Signaling or Physical Layer information such as DCI) of the Network (or gNB), and may be reallocated adaptively in accordance with a change of a system environment. In this case, time offset T may be selected by the UE within a given Set. For example, when Set_T=[1, 2], a shared resource for T=1 and a shared resource for T=2 may refer to the same broadcast resource. This case is set when the broadcast resource and the shared resource are a relation of 1:M. Then, the UE may select a value of time offset T to be used within Set_T and transmit a collision map to the shared resource by the selected value of T, thereby minimizing a problem of destructive interference generated by sharing the shared resource through multiple users. A method for selecting a time offset value T to be used within Set_T is as follows.

Random Selection: time offset index is randomly selected within a time offset set that may be selected.

Modulo computation based Selection: time offset index matched with a modulo computation value is selected within a time offset set that may be selected based on UE ID (in this case, ID may be Physical ID or higher Layer ID, e.g., C-RNTI) in the same manner as computation of mod(UE ID, |T|). For example, in the above example, if UE ID is an odd number, the time offset index may be 1, and when UE ID is an even number, the time offset index may be 2.

In this case, |T| is a size of the time offset set, that is, the number of total indexes, and may be a value of M for 1:M mapping.

Behavior of UE that has detected collision from broadcast resource

Each UE determines whether collision has occurred in a given unit for listening to broadcast information (Step 1). Each UE drafts a collision map by summarizing collision information (Step 2). Drafting of the Collison Map means that each UE selects the shared resource within a given unit in accordance with a mapping rule between the broadcast resource and the shared resource, which is predefined in the system. Each UE transmits the collision map to the shared resource of the given unit after the time offset T (Step 3). Each UE transmits information displaying collision from the shared resource selected by Step 2 in accordance with the time T predefined by the system.

Behavior of UE that transmits data to broadcast resource and interprets collision in shared resource In accordance with a method (e.g., method for selecting a broadcast resource from D2D, V2X, eV2X, etc.), the UE broadcasts data/control information (Step 1). The UE listens to or receives the shared resource in a given unit after T time from the time when data/control information is broadcasted (Step 2). As an Optional Behavior, the UE may receive the shared resource at the time when the UE does not transmit the shared resource even in the case that data/control information is not broadcasted. As a result of listening to the shared resource in the given unit, the UE identifies whether energy beyond predefined threshold is detected from the shared resource index tied with the broadcast resource index transmitted from itself (Step 3). If energy is detected from the shared resource index tied with the broadcast resource index transmitted from the UE (if collision display is detected), the UE performs a resource hopping/reselection procedure of the broadcast resource (Step 4) (this will be described in suggestion 4).

Embodiment: Broadcast Feedback Method in Multi-User Environment

Figure 9:
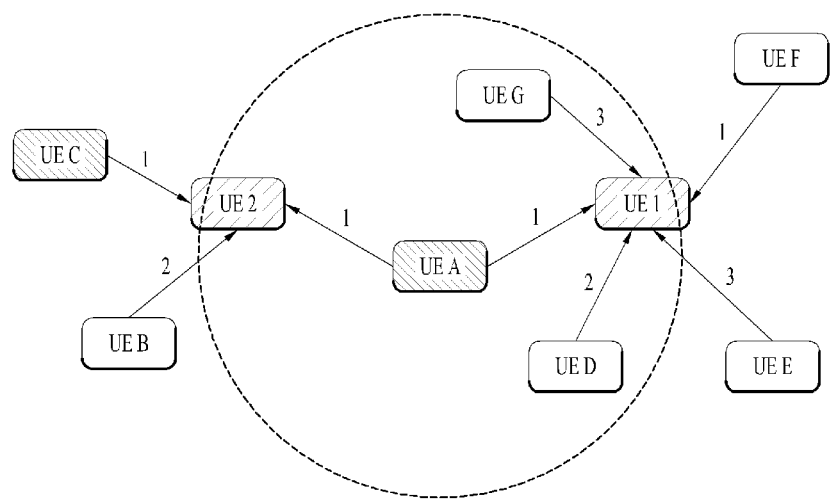
FIG. 9 is a diagram illustrating a broadcast feedback method in a multi-user environment.

FIG. 9 is a diagram illustrating a broadcast feedback method in a multi-user environment.

FIG. 9 illustrates a broadcast feedback method in a multi-user environment for assisting understanding of the suggestion 1. It is assumed that seven users UE A to UE G who have transmitted broadcast data at the same time exist and two users UE 1 and UE 2 who receive the broadcast data exist. A 1:1 mapping environment where the maximum number n of broadcast resources is 4 and the number m of shared resources is 4 is assumed. It is assumed that time offset T is 1. It is assumed that a user who transmits broadcast data has broadcasted data from the broadcast resource in accordance with a method (e.g., method for selecting broadcast resource from D2D, V2X, eV2X, etc.) defined in a broadcast scenario. This case may be as illustrated in FIG. 9.

In FIG. 9, UE A, UE C and UE F select and broadcast the broadcast resource 1, UE B and UE D select and broadcast the broadcast resource 2, and UE G and UE E select and broadcast the broadcast resource 3. UE 1 and UE 2 may respectively perform collision detection by listening (Rx) to the broadcast resource, and a result of collision detection may be as illustrated in FIG. 10.

Figure 10:
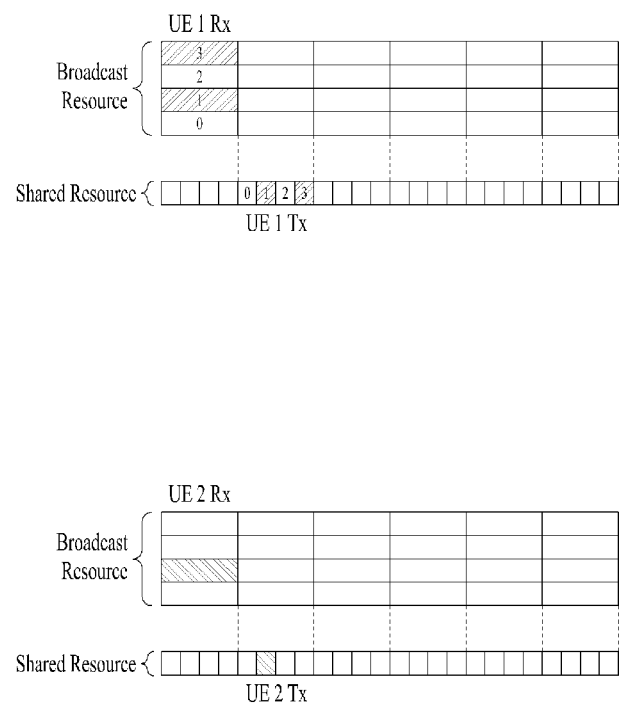
FIG. 10 is a diagram illustrating a result of collision detection performed by UE 1 and UE 2 through listening (Rx) to a broadcast resource.

FIG. 10 is a diagram illustrating a result of collision detection performed by UE 1 and UE 2 through listening (Rx) to a broadcast resource.

The UE 1 performs collision detection (from UE A and F, however, may not recognize whether a corresponding signal is a signal from UE A and F—depending on system assumption) from Resource 1. The UE 1 performs collision detection (from UE E and G, however, may not recognize whether a corresponding signal is a signal from UE E and G—depending on system assumption) from Resource 3. The UE 2 performs collision detection (from UE A and C, however, may not recognize whether a corresponding signal is a signal from UE A and C—depending on system assumption) from Resource 1.

Figure 11:
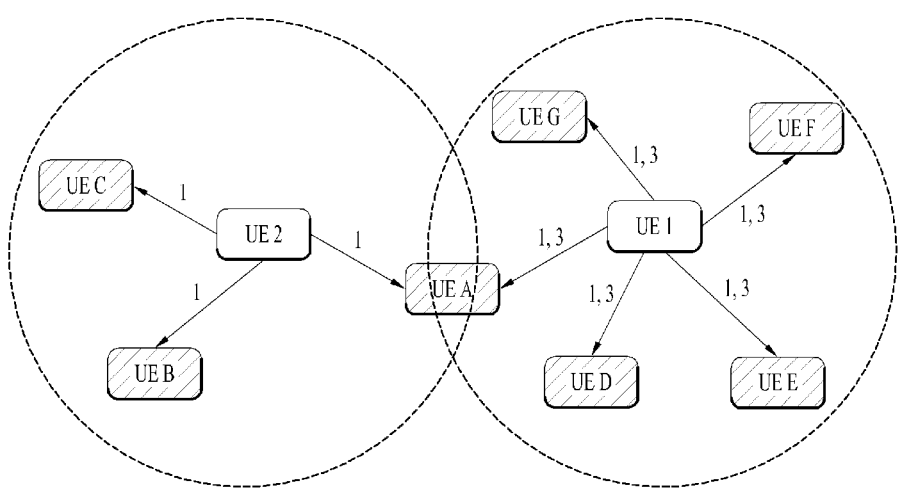
FIG. 11 is a diagram illustrating a result of a shared resource received from UE 1 and UE 2.

FIG. 11 is a diagram illustrating a result of a shared resource received from UE 1 and UE 2.

UE1 and UE2 broadcast a collision map through a shared resource of a given unit at Rx timing+N (in this case, N=1) Slot. In this case, the shared resource is mapped into four broadcast resources by 1:1 mapping, and is selected by indexing information of FIG. 11 and then transmitted. Then, the UE F receives the shared resource from the UE A that has transmitted data through the broadcast resource as shown in FIG. 11.

Figure 12:
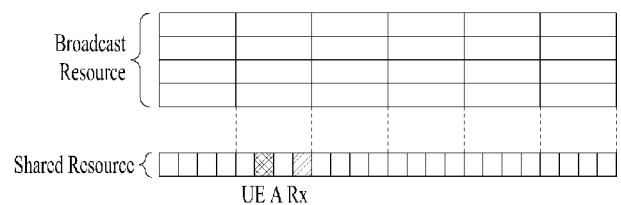
FIG. 12 is a diagram illustrating a shared resource received in view of UE A.

FIG. 12 is a diagram illustrating a shared resource received in view of UE A.

In view of the UE A, collision information from the UE 1 and the UE 2 is received by being accumulated in the shared resource 1, and collision information from the UE 1 and the UE2 is received in the shared resource 3. In this case, reception of collision information means that energy beyond predefined threshold has been detected in the system. Therefore, as the shared resource tied with the broadcast resource transmitted from the UE A is expressed as collision, the UE A recognizes that its broadcast resource collides with another user. Therefore, the UE A performs hopping/reselection for the broadcast resource in accordance with a method defined in suggestion 4.

The UE B receives collision information from the UE 2 in the shared resource 1. Therefore, as the shared resource tied with the broadcast resource transmitted from the UE B is not expressed as collision, the UE B recognizes that its broadcast resource does not collide with another user. Therefore, the UE B continues to data from the broadcast resource in accordance with a method (e.g., method for selecting broadcast resource from D2D, V2X, eV2X, etc.) defined in a broadcast scenario (UE D also continues to transmit data from its broadcast resource based on collision information received from the UE 1).

In view of the UE C, collision information from the UE 2 is received in the shared resource 1. Therefore, as the shared resource tied with the broadcast resource transmitted from the UE C is expressed as collision, the UE C recognizes that its broadcast resource collides with another user. Therefore, the UE C performs hopping/reselection for the broadcast resource in accordance with a method defined in invention 4 (UE E, G and F also perform hopping/reselection for their broadcast resource based on collision information received from the UE 1).

Condition of Collision Map Broadcasting

In case of UE which is not supported by Flexible Duplex, transmission times of collision Map information through the shared resource may be increased in a dense collision environment, whereby the broadcast resource may not be received. At this time, the broadcast resource and the shared resource may be subjected to FDM in Inband. Therefore, a method for broadcasting a collision map in accordance with a Predefined Condition will be suggested. In this case, it will be apparent that the method may equally be applied to even a UE which is not supported by Flexible Duplex.

RSSI Condition

If RSSI of the broadcast resource where collision is detected does not exceed a threshold value $\lambda$, a collision map of corresponding information is not transmitted to the shared resource. In case of a broadcasting system supported by a network, the threshold value $\lambda$ may previously be known by Common Control Signaling (e.g., higher layer information such as RRC Signaling or Physical Layer information such as DCI) of the network (or gNB), and may be reallocated adaptively in accordance with a change of a system environment.

Condition of # of Feedback in Predefined Time Window

If predefined feedback times in the predefined time window are increased, the collision Map is not transmitted to the shared resource. In case of a broadcasting system supported by a network, the predefined time window and the predefined feedback times may previously be known by Common Control Signaling (e.g., higher layer information such as RRC Signaling or Physical Layer information such as DCI) of the network (or gNB), and may be reallocated adaptively in accordance with a change of a system environment.

Condition of Shared Resource Allocation

If the Network may recognize a CBR (channel busy ratio) of the shared resource, the shared resource may not be configured, or signaling indicating temporary turn-off of the configured or allocated shared resource may be given to all UEs or some UEs, whereby all UEs or some UEs may not transmit the collision map through the shared resource. At this time, Share Resource Allocation information may previously be known by Common Control Signaling (e.g., higher layer information such as RRC Signaling or Physical Layer information such as DCI) of the network (or gNB), and may be reallocated adaptively in accordance with a change of a system environment.

Figure 13:
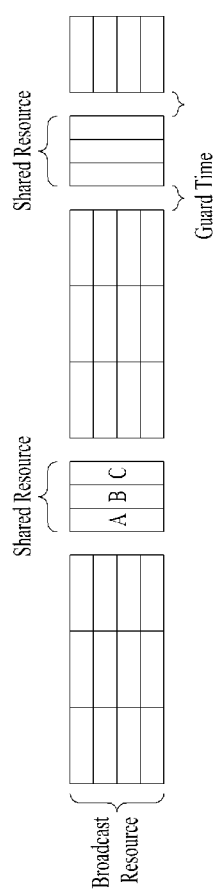
FIG. 13 is a diagram illustrating that a broadcast resource and a shared resource are categorized by TDM scheme in a time-frequency domain.

Suggestion 2: Broadcast Feedback Mechanism Based on Shared Resource from Time Division Manner FIG. 13 is a diagram illustrating that a broadcast resource and a shared resource are categorized by TDM scheme in a time-frequency domain.

The present disclosure suggests a method for performing a broadcast feedback in an environment where the shared resource and the broadcast resource are identified from each other in a time domain. That is, it means that the broadcast resource to which control information/data are transmitted and the shared resource where information on collision of control information/data, decoding failure, etc. is fed back are divided from each other. For example, this case is as illustrated in FIG. 13. That is, specific time slot(s) may always be used for feedback as the shared resource. The broadcast resource is a region for transmitting control information/data in accordance with a method supported by the broadcasting system. For example, in V2V/V2X of the LTE system, the UE may broadcast its control information/data to an empty resource by sensing transmission information of other UEs. The shared resource is a resource shared by all devices, and is an area for transmitting information regardless of transmission of another device. The data broadcasting region and the shared resource region may perform TDD operation. Since UEs should exchange information through Tx and Rx in the broadcast resource and the shared resource, the UEs may be any one of UEs which are supported by FDR, Flexible Duplex, and TDD. For example, in case of FDR device (UE, BS), since Tx/Rx may be performed in all physical resources, the FDR device may be applied regardless of configuration of the broadcast resource and the shared resource.

Broadcast resource—Tx/Rx
Shared resource—Tx/Rx

For example, in case of flexible duplex UE and TDD UE, since the broadcast resource and the shared resource are configured by Time Division Manner, the following operation may equally be performed at one time.

Broadcast resource—Tx
Broadcast resource—Rx
Shared resource—Tx
Shared resource—Rx An operation for emptying the resources without performing Tx or Rx in the broadcast resource or the shared resource may be included in the whole operation. This may be required for energy efficiency or information exchange traffic control, and a control condition may equally be applied in the same manner as the collision map broadcasting condition of the suggestion 1. In the above operation, in order to solve an interference problem between the broadcast resource and the shared resource, a guard time may be considered and may predefined in accordance with a system environment.

In the above operation, in order to solve an interference problem between the shared resource A and the shared resource B and between the shared resource B and the shared resource C, a guard time may be considered and may predefined in accordance with a system environment.

Implicit Time Slot for Shared Resource

Since the shared resource is a resource shared by all UEs, all UEs should recognize the shared resource at the same time slot. Therefore, the time slot between UEs or the time slot for the shared resource among UEs should be notified implicitly. Alternatively, a support of the network or indicator is required. For example, in case of an environment supported by the BS, the time slot may previously be known by Common Control Signaling (e.g., higher layer information such as RRC Signaling or Physical Layer information such as DCI) of the network (or gNB, BS, Central Coordinator, Cluster Header, etc.), and may be reallocated adaptively in accordance with a change of a system environment. The implicit time slot for the shared resource may exist periodically, and a period, a given unit (in view of Time/Frequency Resource), Guard Time, the number of Groups or the number of regions for dividing the shared resources, etc. may be known by the above method or predefined in the system.

Shared Resource Grouping for Collision Map Propagation

Since all UEs correspond to entities for transmitting collision information (collision map) based on the shared resource, each entity cannot receive collision information from another entity at transmission timing. Therefore, transmission/reception should be performed alternately through grouping of the UEs, whereby collision information of neighboring UEs should be received. Therefore, the shared resource region is divided into the number of groups+one region. For example, when the number of UE groups is 2 in FIG. 13, the shared resource is divided into three regions A, B and C. The operation in each region is as follows.

Region A: Group 1 broadcasts a collision map, and Group 2 listens to the collision map from group 1.

Information known by UE which belongs to Group 1: collision information detected by UE Information known by UE which belongs to Group 2: collision accumulation information of devices of Group 1

Region B: Group 2 performs broadcasting by OR computation of its collision map and collision map of Group 1, and Group 1 listens to collision map from Group 2.

Information known by UE which belongs to Group 1: collision accumulation information of devices of Group 1+collision accumulation information of devices of Group 2

Information known by UE which belongs to Group 2: collision accumulation information of devices of Group 1

Region C: Group 1 performs broadcasting for collision map from Group 2, and Group 2 listens to collision map from Group 1.

Information known by UE which belongs to Group 1: collision accumulation information of devices of Group 1+collision accumulation information of devices of Group 2

Information known by UE which belongs to Group 2: collision accumulation information of devices of Group 1+collision accumulation information of devices of Group 2

In the above operation, a difference between groups in an energy consumption value may exist due to collision map transmission from Group 1 of two times and collision map transmission from Group 2 of once. Therefore, each UE may reselect its group periodically or randomly. In this case, a period value or a reselection triggering message may be indicated by support of the network.

Through the above operation, the UEs may receive/understand all kinds of collision map information near themselves. Then, the UEs perform a resource hopping/reselection procedure (described in suggestion 4) through matching (described as broadcast feedback in the following shared resource) of collision information and the resource used in their broadcast. For the above operation, all devices should recognize or select their group. A grouping method depends on the followings.

Random Selection: group index may randomly be selected within a group pool that may be selected.

Modulo computation based Selection: group index matched with a modulo computation value is selected within a group pool that may be selected based on UE ID (in this case, ID may be Physical ID or higher Layer ID, e.g., C-RNTI) in the same manner as computation of mod(UE ID, |G|). For example, in the above example, if UE ID is an odd number, group index may be 1, and when UE ID is an even number, group index may be 2.

In this case, |G| is a size of Group Pool (whole Group), that is, the number of total group indexes, and is set to 2 as a default. If the number of groups is small, a region for identifying the shared resource may be small, whereby it is efficient in resource configuration, and only 2 groups may receive collision map of neighboring devices in three regions.

Broadcast Feedback in Shared Resource

Figure 14:
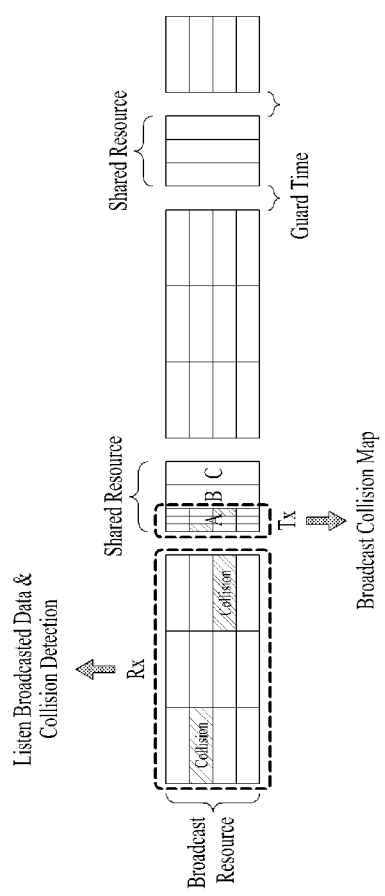
FIG. 14 is a diagram illustrating broadcast feedback in a shared resource.

FIG. 14 is a diagram illustrating broadcast feedback in a shared resource.

UE may detect collision of the broadcast resource. For example, if energy beyond a specific threshold is detected from the broadcast resource but decoding is not performed successfully, it may be determined as collision. This may be performed in both a region to which control information is transmitted and a region to which data are transmitted.

Collision information (or NACK information) of the broadcast resource and the shared resource may be tied at 1:1, N:1 and 1:M. This mapping relation may be operated/understand in the same manner as the mapping rule described in the suggestion 1.

Description of Behavior of UE

Step 1: each UE broadcasts data/control information in accordance with a method (e.g., method for selecting a broadcast resource from D2D, V2X, eV2X, etc.) defined in a Broadcast Scenario.

Step 2: each UE determines whether collision has occurred in a given unit for listening to broadcast information. Each UE may listen to the broadcast information only in a time region where data/control information is not broadcasted by Step 1.

Step 3: each UE drafts a collision map by summarizing collision information. Drafting of the collision map means that each UE selects the shared resource within a given unit in accordance with a mapping rule between the broadcast resource and the shared resource, which is predefined in the system.

Step 4: each UE selects a group or recognizes a group index in accordance with the given group. Each UE performs group selection/reselection in accordance with the method described in "shared resource group for collision map propagation".

Step 4-1: UE corresponding to Group 1 broadcasts a collision map from region A of the shared resource, listens to the collision map from region B of the shared resource, and broadcasts the collision map from region C of the shared resource. A detailed procedure follows the method described in "shared resource group for collision map propagation".

Step 4-2: UE corresponding to Group 2 listens to the collision map from region A of the shared resource, broadcasts the collision map from region B of the shared resource, and listens to the collision map from region C of the shared resource. A detailed procedure follows the method described in "shared resource group for collision map propagation".

Step 5: if energy is detected from the shared resource index tied with the broadcast resource index transmitted from each UE (if collision display is detected), each UE performs a resource hopping/reselection procedure of the broadcast resource (described in suggestion 4).

Suggestion 3: Minimum Destructive Interference in Shared Resource

Figure 15:
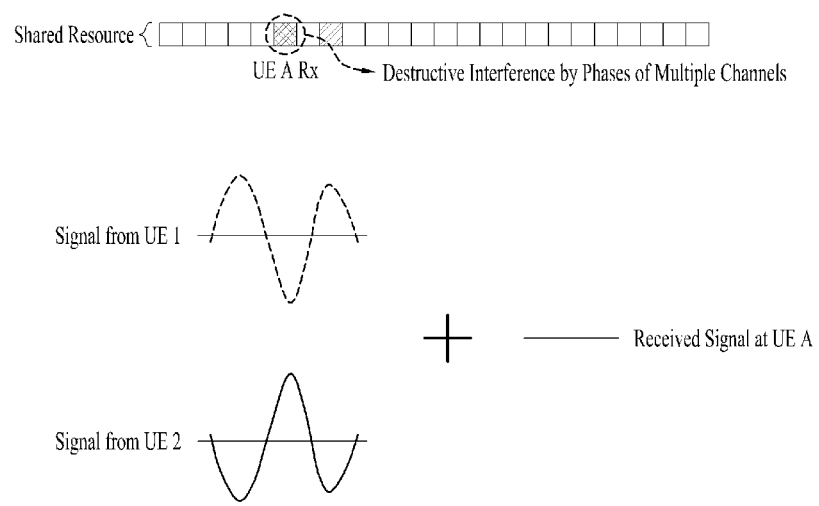
FIG. 15 is a diagram illustrating a method for designing a shared resource to minimize offset interference in a shared resource.

FIG. 15 is a diagram illustrating a method for designing a shared resource to minimize offset interference in a shared resource.

The present disclosure suggests a method for designing a shared resource to minimize destructive interference that may occur as multiple users use the shared resource. In this case, the destructive interference may occur in the shared resource region to which multiple users commonly perform transmission, if two signals are states of phase inversion by channels of multiple users and two signals are added by the receiver to reach a size of 0, whereby energy beyond threshold cannot be detected in spite of information transmission. That is, the collision map of the shared resource may be miss-detected by the receiver if destructive interference occurs due to transmission of multiple users. For example, destructive interference is as illustrated in FIG. 15 based on the embodiment of the suggestion 1.

If each element expressing the collision map includes a single resource element (RE), each element may be vulnerable to destructive interference in energy detection. Therefore, it is suggested that each element expressing the collision map includes multiple REs and is designed to be robust to destructive interference in energy detection (that is, case that there are various sequences of the collision map for displaying collision of one broadcast resource). At this time, this is available if the same coefficient is not repeated in multiple REs, and performance may be improved by the following sequence design for optimization.

Random Sequence/ZC Sequence/Hadamard Sequence Phase Sequence e.g., s1=[0, pi/2, pi, 3*pi/2], s2=s1+pi/2, . . . .

Sparse Sequence e.g., s1=[1 0 1 0], s2=[1 1 0 0], . . .

e.g., s1=[1 0 0 0], s2=[0 1 0 0], . . . .

The UE selects one sequence from a predefined sequence set in the above manner and displays collision on the collision map. A selection method of a sequence within a sequence set mapped into collision of one broadcast resource may be as follows.

Random Selection: the UE randomly selects a sequence index within the sequence set.

Modulo computation based Selection: a sequence index matched with a modulo computation value is selected within a sequence set that may be selected based on UE ID (in this case, ID may be Physical ID or higher Layer ID, e.g., C-RNTI) in the same manner as computation of mod(UE ID, |S|). For example, when four sequences exist in the sequence set, if UE ID is 1, the sequence index may be 1, and if UE ID is 6, the sequence index may be 2.

Even in the above operation, multiple UEs may select the same sequence for collision of the same broadcast resource, and if energy detection does not exceed a detection threshold value due to occurrence of destructive interference for phase inversion of a channel, the receiver may not recognize energy detection. Also, if multiple shared resources are multiplexed by FDM, miss-detection may occur in the receiver due to near-far-effect in accordance with a sequence characteristic. This problem will be solved in suggestion 5.

Suggestion 4: Hopping/Reselection Procedure for Broadcast Link

The present disclosure suggests a hopping/reselection procedure of a broadcast resource for transferring data/control information when a UE which has transferred data/control information through the broadcast resource recognizes collision through the shared resource, based on suggestion 1, suggestion 2 and suggestion 3. UEs which have listened to the shared resource perform hopping or reselection of the broadcast resource reserved (or used) by themselves through the following operation.

Step 1: UEs which have interpreted a collision Map identifies whether they transmit data to the broadcast resource tied with information marked in the collision map.

Step 2-1: if UE does not transmit its data to the broadcast resource tied with information marked in the collision Map, the UE does not change its broadcast resource.

Step 2-2: if UE does not transmit its data to the broadcast resource tied with information marked in the collision Map, the UE drafts a candidate matrix to change its broadcast resource.

The candidate matrix may include probability elements, and depends on the following rule.

An avoidance resource is marked with a probability of 0 based on listen information for a sensing time for collision avoidance, which is predefined in the system. In this case, the listen information for a sensing time is monitoring information, and is not a value newly started for hopping or reselection but marked based on the listen information even in case of no broadcast resource. For example, in case of 'broadcast feedback mechanism based on shared resource in FDD' of suggestion 1, as shown in FIG. 15, a candidate matrix may be configured based on Tx collision information and the listen information for a predefined sensing time.

Figure 16:
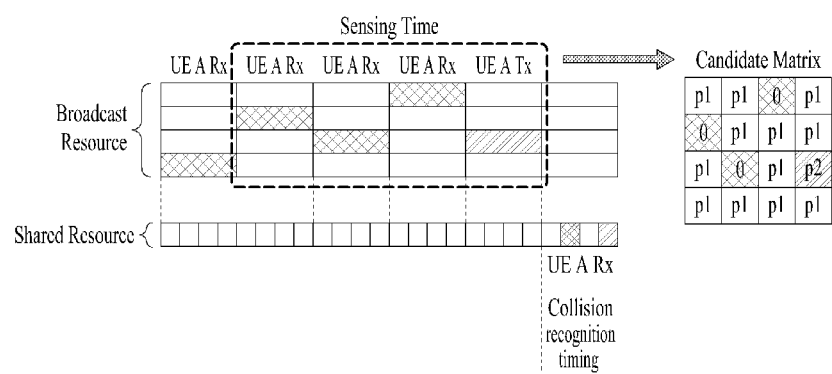
FIG. 16 is a diagram illustrating a method for configuring a candidate matrix based on Tx collision information and Listen information for a predefined sensing time.

FIG. 16 is a diagram illustrating a method for configuring a candidate matrix based on Tx collision information and Listen information for a predefined sensing time.

In FIG. 16, p1 and p2 are resource selection probabilities for resource hopping/reselection in the broadcast resource, and may have a probability of 12*p1+p2=1. p1 is a broadcast resource determined to be used by none, and p2 is a broadcast resource where collision of the broadcast resource transmitted from a corresponding user is recognized. Since there is no listen information when the UE is performing broadcasting, a corresponding resource cannot be avoided. Therefore, when a candidate map is drafted, the UE may mark a candidate resource for the time when the UE performs transmission with a probability of 0. Also, for example, in case of 'broadcast feedback mechanism based on shared resource in TDD' of suggestion 2, UE A which belongs to Group 1 may configure a candidate matrix based on its Tx collision information, collision information of another user and the listen information for a predefined sensing time by acquiring collision information of another user even in case of transmission time in the shared resource.

Figure 17:
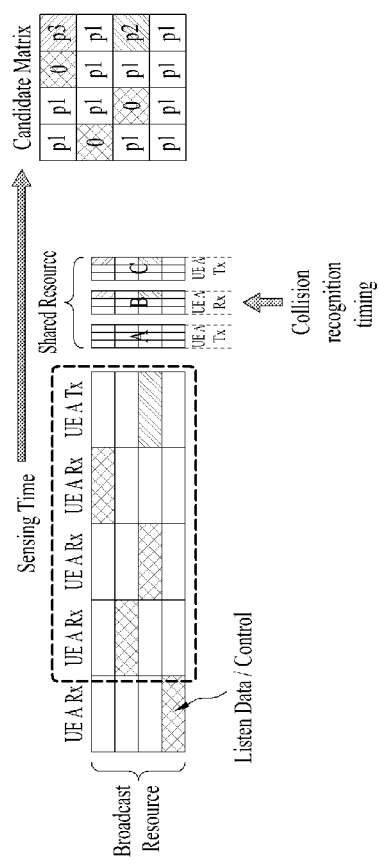
FIG. 17 is a diagram illustrating a method for configuring a candidate matrix based on Tx collision information, collision information of another user, and Listen information for a predefined sensing time.

FIG. 17 is a diagram illustrating a method for configuring a candidate matrix based on Tx collision information, collision information of another user, and Listen information for a predefined sensing time.

Referring to FIG. 17, p1, p2 and p3 are resource selection probabilities for resource hopping/reselection in the broadcast resource, and may have a probability of 12*p1+p2=1. p1 is a broadcast resource determined to be used by none, p2 is a broadcast resource where occurrence of collision of the broadcast resource transmitted from a corresponding user is recognized, and p3 is a broadcast resource where occurrence of collision of the broadcast resource transmitted from other users is recognized. Since there is collision information when the UE is performing broadcasting, all collision resources are able to be avoided. That is, in the above two example, camping may be performed for a collision position at the probability of P2 (and/or p3), and hopping or reselection is performed for another position at the probability of p1. If p2 (and/or p3) is set in the system, hopping/reselection is performed by avoiding the collision resource. In the system, p1=(1−p2)/(the number of candidate resources) may be set in accordance with setting of p2 (and/or p3).

p1, p2 and p3 may be predefined in the system, and in case of an environment supported by the BS, p1, p2 and p3 may previously be known by Common Control Signaling (e.g., higher layer information such as RRC Signaling or Physical Layer information such as DCI) of the network (or gNB, BS, Central Coordinator, Cluster Header, etc.), and may be reallocated adaptively in accordance with a change of a system environment.

Sensing Time Offset for Collision Avoidance

Figure 18:
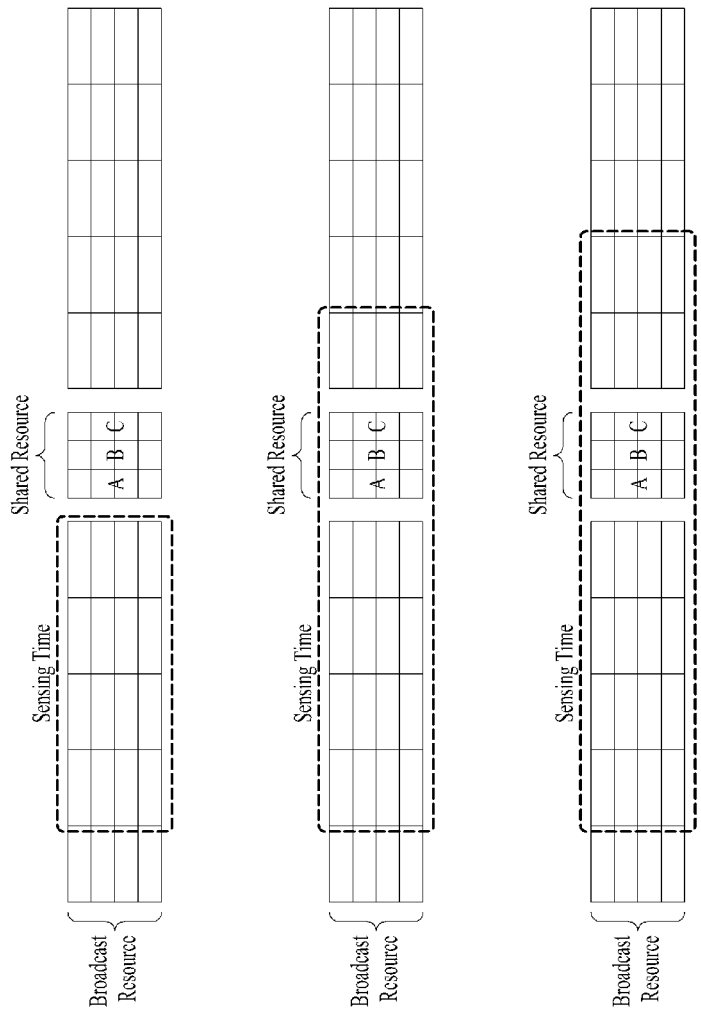
FIG. 18 is a diagram illustrating a sensing time operation varied depending on a UE.
Figure 19:
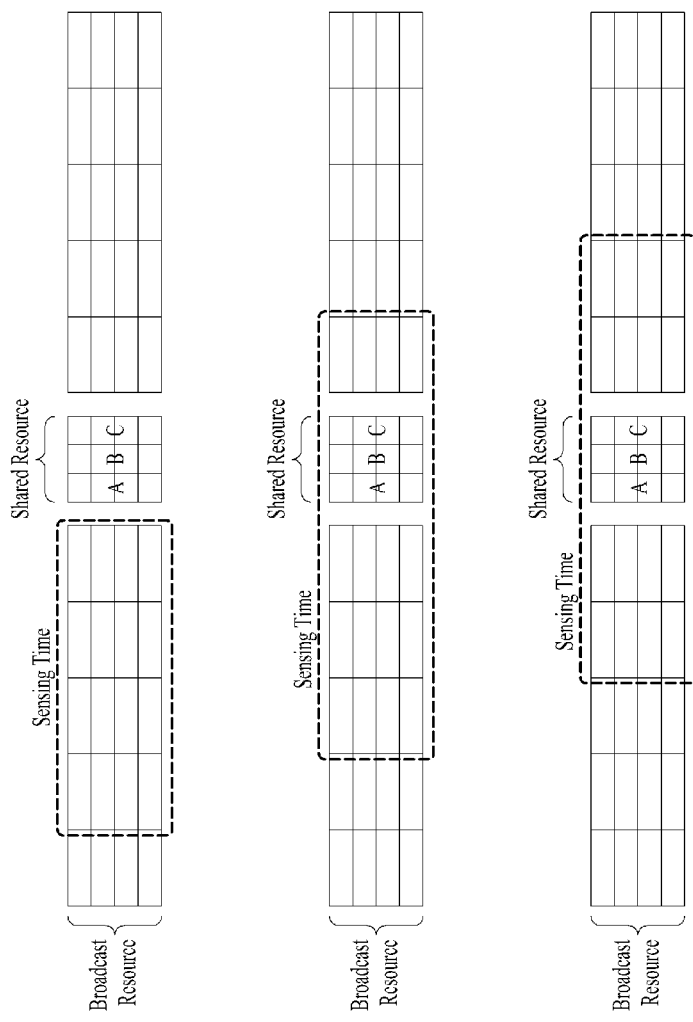
FIG. 19 is a diagram illustrating an operation of offset of a sensing time varied depending on a UE.

FIG. 18 is a diagram illustrating a sensing time operation varied depending on a UE, and FIG. 19 is a diagram illustrating an operation of offset of a sensing time varied depending on a UE.

Referring to FIG. 18, multiple users (or UEs) may recognize collision based on the shared resource, and at the same time may perform broadcast resource hopping/reselection. In this case, since multiple users may have similar sensing information, multiple users may again select the same broadcast resource, whereby collision may again occur. Therefore, timing when each user performs hopping/reselection based on sensing time offset may be varied, whereby additional collision may be avoided. For example, as shown in FIG. 18, a sensing time varied depending on the UE may operate.

Alternatively, for example, offset of the sensing time may operate as illustrated in FIG. 19.

The UE may perform Resource Hopping/Reselection after sensing time, whereby the UE may perform resource selection differently from another collision UE. The same manner may be applied to even the case of FDD. Selection of the sensing time may be performed by an autonomous operation in the UE, and may be performed as follows.

Random Selection: the UE randomly selects a sensing time within a sensing time set.

Modulo computation based Selection: a sensing time index matched with a modulo computation value is selected within a sensing time set that may be selected based on UE ID (in this case, ID may be Physical ID or higher Layer ID, e.g., C-RNTI) in the same manner as computation of mod(UE ID, |T|). For example, when four sensing times (e.g., 10 ms, 20 ms, 30 ms and 40 ms) exist in the sensing time set, if UE ID is 1, the sensing time index is 1 and the sensing time may be 10 ms, and if UE ID is 6, the sensing time index is 2 and the sensing time may be 20 ms. In this case, |T| is a size of the sensing time set, that is, the number of total indexes.

Selection of the sensing time offset may be performed by an autonomous operation in the UE, and may be performed as follows.

Random Selection: the UE randomly selects a sensing time offset within a sensing time offset set.

Modulo computation based Selection: a sensing time offset index matched with a modulo computation value is selected within a sensing time offset set that may be selected based on UE ID (in this case, ID may be Physical ID or higher Layer ID, e.g., C-RNTI) in the same manner as computation of mod(UE ID, |T_ol|). For example, when four sensing time offsets (e.g., 1 slot, 2 slots, 3 slots and 4 slots) exist in the sensing time offset set, if UE ID is 1, the sensing time offset index is 1 and the sensing time offset may be 1 slot, and if UE ID is 6, the sensing time offset index is 2 and the sensing time offset may be 2 slots.

In this case, |T_ol| is a size of the sensing time offset set, that is, the number of total indexes.

The sets for the sensing time and the sensing time offset in the above description may be predefined in the system. In case of an environment supported by the BS, the sets may previously be known by Common Control Signaling (e.g., higher layer information such as RRC Signaling or Physical Layer information such as DCI) of the network (or gNB, BS, Central Coordinator, Cluster Header, etc.), and may be reallocated adaptively in accordance with a change of a system environment.

Suggestion 5: Open Loop Power Control for Solving Near-Far-Effect

In suggestion 3, to minimize destructive interference, if sequence is used (or even though RE is used without use of sequence) and multiple shared resources are multiplexed by FDM, miss-detection of a receiver may occur due to Near-Far-Effect. That is, if AGC operation is performed by a reception power from the nearest UE, a reception power from the farthest UE by the near-far-effect may be lowered to a noise level. In this case, among UEs that have detected collision, the UE nearest to the receiver reserves a considerable part of reception energy, whereby feedback information is determined by the presence of the corresponding UE. Therefore, a method for controlling a power for transmitting collision map information to a shared resource based on Open Loop Power Control (OLPC) will be suggested.

First of all, for OLPC for multiple users (who will receive the shared resource), pathloss (PL) measurement for each user who will receive the shared resource is required, and pathloss may be inverse-counted based on a reception power in control information connected with broadcast data of multiple users who have generated collision (it is assumed that Tx power is included in control information if Tx power of UEs is not fixed). For example, pathloss may be estimated as follows.

Method for estimating PL by measuring RSRP of control information: since control uses the limited number of minimum DMRSs, a reception UE performs blind detection for DMRS in the resource where collision occurs and adds up or makes an average of RSRP for RS detected at a certain threshold value or more or uses a maximum or minimum value for PL estimation.

PL estimation based on RSRP measurement of DMRS of data when decoding of control information has been performed successfully: if collision of data information connected to control information occurs in a state that of decoding of control information has been performed successfully, blind detection of DMRS is performed in the data resource and as a result RSRPs for RS detected at a certain threshold value or more are added up or averaged or a maximum or minimum value is used for PL estimation.

PL estimation based on RSSI of a control region when RSRP of control information is not measured: When Tx power is not identified due to decoding failure of control and feedback of a resource (for example, if RSSI is great but decoding is continuously failed, signal is received but it is determined that collision has occurred) determined that collision has occurred is performed, power is controlled in proportion to RSSI. If RSSI is very great, since neighboring nodes generate collision, a power of the shared resource may be reduced. If RSSI is very small, since nodes far away from each other generate collision, a power of the shared resource may be increased.

Suggestion 6: Collision Map Compression Based on Compressive Sensing

If the collision map in suggestion 1 to suggestion 5 is transmitted to the shared resource, a size of the collision map is too great, whereby more shared resources may be required. In an environment where dense collision is not generated, more resources may be wasted for exchange for collision information (due to resource reserve). Therefore, a method for exchanging collision information through the shared resource by drafting a compressive sensing based collision map will be suggested.

For description, notation will be defined as follows.
Definition of Notation:
A: predefined sensing matrix (e.g., Gaussian random matrix or Bernoulli random matrix, . . . )
x: feedback information vector (in feedback UE)
H: measured collision matrix (or vector); @Feedback UE from broadcasted data/control signal
vec_sel(.): vectorization of matrix
h_i: channel from ith Feedback UE Behavior of UE which Performs Compressive Sensing (CS) Based Broadcast Feedback in Shared Resource Step 1: UE sets a collision map for feedback based on the measured collision matrix to a matrix H. For description, it is assumed that a size of H is M by K (L: the number of frequency resources, N: the number of time resources). Then, it is assumed that H includes Binary Elements and the number of maximum non-zero elements is 'a'. In accordance with the number 'a' of maximum non-zero elements, Reference Signal Received Power (RSRP)/Received Signal Strength Indicator (RSSI) of the broadcast resource where collision has occurred may be ordered to make a collision map by collision of higher 'a'.

Step 2: UE obtains 'x' from x=A×vec_sel(H), and transfers 'x' to another UE through the shared resource. At this time, A (size is P by L*N) may be a Bernoulli random matrix (matrix that includes elements +1 and −1) or Gaussian Random matrix, and is predefined in the system. In this case, A matrix is a sensing matrix that should equally be used by all UE which perform a broadcast feedback through the shared resource. However, another sensing matrix may be used in the shared resource of another timing but a sensing matrix used at the same timing should equally be used by all users to accumulate CS based collision map of multiple users. In this case, P is an observation size, and is a multiple of 2 of multiplication of the maximum value 'a' of non-zero elements and maximum users 'b' that may simultaneously be accumulated in the shared resource (P=2*a*b). That is, a given minimum unit of the shared resource is limited to a size of 'x', or is limited to a size of M*x for 1:M mapping of the broadcast resource and the shared resource. a, b, L, N, A, etc. may be determined or set by a system environment, and are values previously known by all UEs. In an environment capable of being supported by a network, the network may control the above parameter values and transmit the parameter values to all UEs through Common Control Signaling. Then, the UE performs the above procedure based on updated parameters.

Behavior of UE which Receives Compressive Sensing (CS) Based Broadcast Feedback in Shared Resource Step 1: since UE which has received a broadcast feedback in the shared resource receives feedbacks of multiple UEs, y=h_1*x_1+h_2*x_2+n is received. (For description, accumulated information from two UEs is assumed.) In this case, x_1=vec_sel(H1), and x_2=vec_sel(H2).

Step 2: UE estimates a value of h1*vec_sel(H1)+h2*vec_sel(H2) from the received y and an inverse matrix of A, and performs an inverse procedure of vec_sel, whereby an accumulated collision matrix, h1*H1+h2*H2 is obtained. However, since H1 and H2 are Binary matrixes, a destructive problem caused by h1 and h2 exist.

Step 3: UE recognizes h1*H1+h2*H2 as a collision Map, identifies whether the broadcast resource tied with the collision Map has been used for transmission, and determines whether to perform Resource Hopping/Reselection procedure. If the broadcast resource tied with the collision Map is not used for transmission, the original broadcast resource is used as it is. If the broadcast resource tied with the collision Map is used for transmission, resource hopping/reselection procedure is performed (described in suggestion 4).

It will be apparent that the above-described details may be applied to a system design (environment where a frequency division manner and a time division manner are used by the shared resource) in which suggestion 1 and suggestion 2 coexist. In this case, the network may be configured such that a UE capable of performing a flexible duplex operation uses a shared resource of the frequency division manner and a UE capable of performing only a TDD operation uses a shared resource of the time division manner. The network may be configured by a higher layer signal such as RRC (Radio Resource Control) Signaling or L1 Signaling such as DCI (Downlink Control Information). It will be apparent that the UE capable of performing the flexible duplex operation may use the shared resource of the time division manner.

In the suggestion 1, a T value of 'time offset of shared resource' may be set/configured differently depending on the UE capable of performing the flexible duplex operation and the UE incapable of performing the flexible duplex operation.

Subcarrier spacing of the resource elements (RE) constituting the shared resources in the inventions 1 to 6 described as above may be different from subcarrier spacing of the resource elements (RE) constituting the broadcast resources. For example, the subcarrier spacing of the resource elements (RE) constituting the shared resources may be set to be greater than the subcarrier spacing of the resource elements (RE) constituting the broadcast resources, whereby a symbol duration of the resource elements (RE) of the shared resources may be configured to be short, especially configured to be shorter in a time domain.

Although Multi-point to Multi-point is described in the environment of the suggestions 1 to 6, an operation of multi-point to point or point to Multi-point may be applied to the environment of the suggestion 1 to the suggestion 6. Therefore, an entity expressed as UE or device may be UE, user, gNB, and BS, and this case may be applied to even a cellular environment where UE and BS exist. The description of the present disclosure will be given based on transmission and reception between devices but is applicable to all systems that use a multi-user access scheme such as DL/UL Link or Machine Type Communication (MTC), Device-to-Device (D2D), Vehicle-to-Everything (V2X) Link or Multi-cast/Broadcast.

Procedure of UE that Transmits Feedback Information Related to Suggestions 1 to 6

Figure 20:
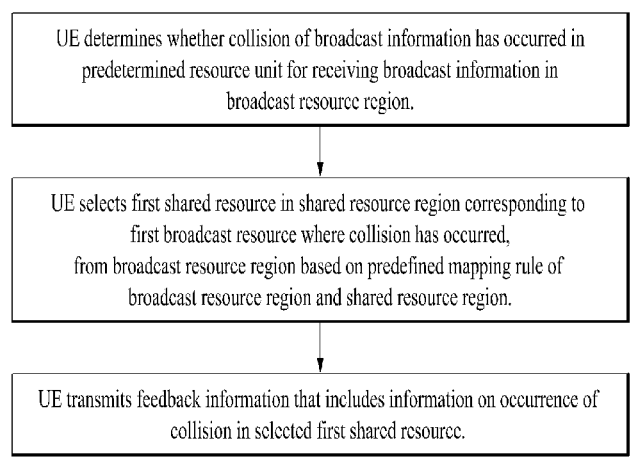
FIG. 20 is a diagram illustrating a procedure of a UE for transmitting feedback information related with Suggestions 1 to 6.

FIG. 20 is a diagram illustrating a procedure of a UE for transmitting feedback information related with Suggestions 1 to 6.

Referring to FIG. 20, the UE may determine whether collision of broadcast information has occurred in a predetermined resource unit for receiving broadcast information in a broadcast resource region. The UE may select a first shared resource in a shared resource region corresponding to a first broadcast resource where the collision has occurred, from the broadcast resource region based on a predefined mapping rule of the broadcast resource region and the shared resource region. The UE may include the step of transmitting feedback information that includes information on occurrence of the collision in the selected first shared resource. In this case, the broadcast resource region is a resource region defined to transmit or receive the broadcast information, and the shared resource region may be defined as a resource region shared among multiple UEs. The UE may determine that collision has occurred in the determining step when energy detected in a predetermined resource unit exceeds a predefined threshold value but decoding of the broadcast information is failed in the predetermined resource unit.

The UE may select a second shared resource in a shared resource region corresponding to a second broadcast resource where the collision has occurred, from the broadcast resource region based on the predefined mapping rule of the broadcast resource region and the shared resource region. The UE may transmit the feedback information that includes information on occurrence of the collision in the selected second shared resource.

The predetermined resource unit may correspond to one time slot. The broadcast resource region and the shared resource region may be configured in the time and frequency domains in accordance with a frequency division multiplexing manner or time division multiplexing manner. The UE may receive information on the predefined mapping rule of the broadcast resource region and the shared resource region from the BS.

Procedure of UE that Receives Feedback Information Related to Suggestions 1 to 6

Figure 21:
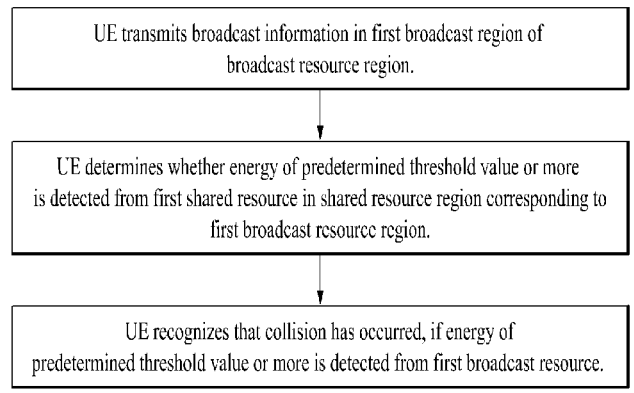
FIG. 21 is a diagram illustrating a procedure of a UE for transmitting feedback information related with Suggestions 1 to 6.

FIG. 21 is a diagram illustrating a procedure of a UE for transmitting feedback information related with Suggestions 1 to 6.

Referring to FIG. 21, the UE may transmit broadcast information in the first broadcast region of the broadcast resource region. The UE may determine whether energy of a predetermined threshold value or more is detected from the first shared resource in the shared resource region corresponding to the first broadcast resource region. If energy of a predetermined threshold value or more is detected, the UE may select the second broadcast resource as a broadcast resource for transmitting the broadcast information. The UE may transmit the broadcast information in the second broadcast resource. The UE may recognize that collision has occurred, if energy of a predetermined threshold value or more is detected from the first broadcast resource.

UE that Transmits Feedback Information Related to Suggestions 1 to 6

A processor 21 of the UE may determine whether collision of broadcast information has occurred in a predetermined resource unit for receiving broadcast information in a broadcast resource region. The processor 21 of the UE may select a first shared resource in a shared resource region corresponding to a first broadcast resource where the collision has occurred, from the broadcast resource region based on a predefined mapping rule of the broadcast resource region and the shared resource region. A transmitter 23 of the UE may include the step of transmitting feedback information that includes information on occurrence of the collision in the selected first shared resource. In this case, the broadcast resource region is a resource region defined to transmit or receive the broadcast information, and the shared resource region may be defined as a resource region shared among multiple UEs. The processor 21 of the UE may determine that the collision has occurred in the determining step when energy detected in a predetermined resource unit exceeds a predefined threshold value but decoding of the broadcast information is failed in the predetermined resource unit. The processor 21 of the UE may select a second shared resource in a shared resource region corresponding to a second broadcast resource where collision has occurred, from the broadcast resource region based on the predefined mapping rule of the broadcast resource region and the shared resource region. The transmitter 23 of the UE may transmit feedback information that includes information on occurrence of the collision in the selected second shared resource. The predetermined resource unit may correspond to one time slot. The broadcast resource region and the shared resource region may be configured in the time and frequency domains in accordance with a frequency division multiplexing manner or time division multiplexing manner. A receiver 23 of the UE may receive information on the predefined mapping rule of the broadcast resource region and the shared resource region from the BS.

UE that Receives Feedback Information Related to Suggestions 1 to 6

The transmitter 23 of the UE may transmit broadcast information in a first broadcast resource of a broadcast resource region. The processor 21 of the UE may determine whether energy of a predetermined threshold value or more is detected from the first shared resource in the shared resource region corresponding to the first broadcast resource. The processor 21 of the UE may select a second broadcast resource as a broadcast resource for transmitting the broadcast information if energy of a predetermined threshold value or more is detected. The processor 21 of the UE may transmit the broadcast information in the second broadcast resource. The UE may recognize that the collision has occurred, if energy of a predetermined threshold value or more is detected from the first broadcast resource.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for transmitting and receiving feedback information and the UE therefor are industrially applicable to various kinds of mobile communication systems such as 3GPP LTE/LTE-A system, 5G communication system, etc.

The invention claimed is:

1. A method for transmitting feedback information by a UE, the method comprising:
    determining whether collision of broadcast information has occurred in a predetermined resource unit for receiving broadcast information in a broadcast resource region;
    selecting a first feedback resource for transmission of feedback information in a shared resource region corresponding to a first broadcast resource where the collision has occurred, from the broadcast resource region based on a predefined mapping rule of the broadcast resource region and the shared resource region; and
    transmitting the feedback information that includes information on occurrence of the collision in the selected first feedback resource,
    wherein the broadcast resource region is a resource region defined to transmit or receive the broadcast information, and the shared resource region is defined as a resource region shared among multiple UEs, and
    wherein the first feedback resource is determined based on a value obtained by modulo operation of a physical layer UE ID with a number of resources in the shared resource region.

2. The method of claim 1, wherein the determining step includes determining that the collision has occurred when energy detected in the predetermined resource unit exceeds a predefined threshold value but decoding of the broadcast information is failed in the predetermined resource unit.

3. The method of claim 1, further comprising:
    selecting a second feedback resource in a shared resource region corresponding to a second broadcast resource where the collision has occurred, from the broadcast resource region based on the predefined mapping rule of the broadcast resource region and the shared resource region; and
    transmitting feedback information that includes information on occurrence of the collision in the selected second feedback resource.

4. The method of claim 1, wherein the predetermined resource unit corresponds to one time slot.

5. The method of claim 1, wherein the broadcast resource region and the shared resource region are configured in time and frequency domains in accordance with a frequency division multiplexing manner or time division multiplexing manner.

6. The method of claim 1, further comprising receiving information on the predefined mapping rule of the broadcast resource region and the shared resource region from a BS.

7. A UE for transmitting feedback information, the UE comprising:
    a processor determining whether collision of broadcast information has occurred in a predetermined resource unit for receiving broadcast information in a broadcast resource region, and selecting a first feedback resource for transmission of feedback information in a shared resource region corresponding to a first broadcast resource where the collision has occurred, from the broadcast resource region based on a predefined mapping rule of the broadcast resource region and the shared resource region; and
    a transmitter transmitting the feedback information that includes information on occurrence of the collision in the selected first feedback resource,
    wherein the broadcast resource region is a resource region defined to transmit or receive the broadcast information, and the shared resource region is defined as a resource region shared among multiple UEs, and
    wherein the first feedback resource is determined based on a value obtained by modulo operation of a physical layer UE ID with a number of resources in the shared resource region.

8. The UE of claim 7, wherein the processor determines that the collision has occurred when energy detected in the predetermined resource unit exceeds a predefined threshold value but decoding of the broadcast information is failed in the predetermined resource unit.

9. The UE of claim 7, wherein the processor selects a second feedback resource in a shared resource region corresponding to a second broadcast resource where the collision has occurred, from the broadcast resource region based on the predefined mapping rule of the broadcast resource region and the shared resource region, and the transmitter transmits feedback information that includes information on occurrence of the collision in the selected second feedback resource.

10. The UE of claim 7, further comprising a receiver receiving information on the predefined mapping rule of the broadcast resource region and the shared resource region from a BS.

11. The UE according to claim 7, wherein the UE is capable of communicating with at least one of another UE, a UE related to an autonomous driving vehicle, a base station or a network.

\* \* \* \* \*